US005535996A

United States Patent [19]

Dancause

[11] Patent Number: 5,535,996

[45] Date of Patent: Jul. 16, 1996

[54] APPARATUS AND METHOD FOR PRODUCING WRINKLE-FREE SIGNATURES

[75] Inventor: James M. Dancause, Mountville, Pa.

[73] Assignee: R. R. Donnelley & Sons Company, Lisle, Ill.

[21] Appl. No.: 258,792

[22] Filed: Jun. 13, 1994

[51] Int. Cl.$^{6}$ .............................. B41F 13/58; B23D 25/02

[52] U.S. Cl. ...................................... 270/6; 270/8; 83/332

[58] Field of Search .................................. 270/21.1, 5, 6, 270/10, 18, 41, 42, 43, 32, 20.1, 8; 493/355, 399, 404, 357, 358, 359, 360; 83/332

[56] References Cited

U.S. PATENT DOCUMENTS

| | | | |
|---|---|---|---|
| Re. 15,328 | 4/1922 | Overbury | 83/332 X |
| 1,625,862 | 4/1927 | Martin | 270/42 |
| 2,018,855 | 10/1935 | Imshaug | 270/5 X |
| 2,361,140 | 10/1944 | Wolf | 270/5 |
| 3,211,066 | 10/1965 | Palamenti | 83/332 X |
| 3,697,061 | 10/1972 | Levine et al. | 270/5 |
| 4,279,409 | 7/1981 | Pemberton | 270/5 |
| 4,524,962 | 6/1985 | Davenport et al. | 270/21.1 |
| 4,564,470 | 1/1986 | Schmitt | 270/5 X |
| 4,787,653 | 11/1988 | Stewart, Jr. | 493/404 X |
| 5,144,874 | 9/1992 | Garrett | 83/332 |

*Primary Examiner*—John E. Ryznic
*Attorney, Agent, or Firm*—Marshall, O'Toole, Gerstein, Murray & Borun

[57] ABSTRACT

In order to eliminate gusset wrinkles in a closed end signature, a unique new and improved method and apparatus are disclosed. The method and apparatus contemplate printing a plurality of webs on presses to provide ribbons to be utilized in forming the signatures, delivering the ribbons after the webs have been printed on the presses to a common point for ribbon merger, and merging the ribbons at the common point to provide a composite to be utilized in forming the signatures. They further include folding the composite in order to form backbone folds defining the closed ends of the signatures, cutting the composite into individual ones of the signatures before or after folding to form the backbone folds, and again folding the individual ones of the signatures cut from the composite in order to form intermediate folds. Additionally, the method and apparatus include slitting the ribbons before or after the ribbons have been merged to provide a slit in at least a portion of the closed ends after forming the signatures.

22 Claims, 2 Drawing Sheets

APPARATUS AND METHOD FOR PRODUCING WRINKLE-FREE SIGNATURES

FIELD OF THE INVENTION

The present invention is generally directed to the forming of signatures to be gathered on a binding line and, more particularly, to an apparatus and method for producing signatures of the closed end type that are wrinkle-free.

BACKGROUND OF THE INVENTION

In the production of signatures, a plurality of webs are printed on one or more presses to provide ribbons to be utilized in forming the signatures. The ribbons are typically delivered to a common point for ribbon merger after the webs have been printed on the presses. By merging the ribbons at the common point, a composite is provided which is then utilized in forming the signatures for gathering on a binding line.

In some cases, it is quite well known that it is particularly difficult to produce a signature that is entirely wrinkle-free. This is especially true in the case of closed end signatures wherein the signature has a head fold with a lead edge forward of the head fold and a trail edge rearward of the head fold. More specifically, gusset wrinkles in closed end signatures have been a serious ongoing problem in the printing industry for decades.

In this connection, the problem is difficult to solve in view of the variables that are encountered in the production of signatures. It is known, for instance, that the size of the signatures, i.e., the number of pages, and the different paper stocks that are run on presses, have significant variations which, among other things, would make it difficult for signatures without closed ends to be handled in both the press room and the bindery. Nevertheless, it is believed that the entirely closed signature end is what contributes most significantly to wrinkle production.

In addition, there are significant problems inherent in the environment of the press room and bindery in terms of material handling systems. It is especially important that any attempt to solve the wrinkle problem take into consideration the manner in which signatures are handled in both settings. More to the point, the signatures must remain stable if they are to be capable of handling by automated material handling systems.

As is known, the gusset wrinkle problem has only been exacerbated by the addition of automated material handling systems. This result has also followed from the fact that there are presently much wider web presses in service that produce large page counts for individual signatures, e.g., the average page count per signature is up from 48 pages several years ago to 64 pages today. Additionally, the gusset wrinkle problem has been further exacerbated by the fact that there are increased press speeds.

As for the effect of the wrinkles on the finished product, it varies from illegible type to advertisements that are unappealing to the eye. Numerous efforts have been made to overcome the problem, some of which have had a slightly positive effect, i.e., reducing the size and location of the wrinkle, but to date there has been nothing available that eliminates the gusset wrinkle in the finished product. As a result, the present invention is directed to overcoming this problem by making it possible to produce a wrinkle-free signature.

SUMMARY OF THE INVENTION

It is therefore a principal object of the present invention to provide an apparatus and method for producing a wrinkle-free signature. It is a further object to provide such a signature which is of the head fold type having a backbone fold defining a closed end. It is an additional object of the present invention to provide a slitting apparatus for cutting at least a portion of the closed end to produce a wrinkle-free signature.

Accordingly, the present invention is directed to an apparatus for producing a wrinkle-free signature of the type having a backbone fold defining a closed end and an intermediate fold transverse to said backbone fold with a lead edge forward of the intermediate fold and a trail edge rearward of the intermediate fold. The apparatus includes a press for printing a plurality of webs to provide ribbons to be utilized in forming the signatures, means for delivering the ribbons after the webs have been printed on the press to a common merger point, and means for merging the ribbons at the common merger point to form a composite for forming the signatures. The apparatus also includes means for folding the composite in order to form the backbone folds defining the closed ends of the signatures, means for cutting the composite into individual ones of said signatures before or after forming the backbone fold, and means for folding the individual ones of the signatures cut from the composite to form the intermediate folds. With this arrangement, the apparatus also includes means for slitting the ribbons before or after the ribbons have been merged to form the composite in such manner as to result in a slit in at least a portion of the closed ends after forming the signatures and, preferably, accomplishing this by timed slitting of the ribbon composite after the printed ribbons have been merged.

More specifically, the timed slitting of the ribbon composite is advantageously accomplished after forming the ribbon composite but before folding to form the backbone folds or the intermediate folds.

In the exemplary embodiment, the cutting means includes means for cutting at least a portion of the lead edges of the signatures. It is particularly advantageous for this to be accomplished by cutting substantially the entirety of what is to become the lead edges of the signatures by cutting through all of the printed ribbons which have been merged to provide the ribbon composite. For this purpose, the apparatus preferably includes a wheel mounted for rotation on a shaft and having a blade only on a portion of the circumference thereof.

In another respect, the invention is directed to a method of producing a wrinkle-free signature which includes the step of printing a plurality of webs on one or more presses to provide ribbons to be utilized in forming the signatures. The method also includes the steps of delivering the ribbons after the webs have been printed on the presses to a common point for ribbon merger and merging the ribbons at the common point to provide a composite to be utilized in forming the signatures. The method further includes the steps of folding the composite in order to form backbone folds defining closed ends of the signatures, cutting the composite into individual ones of the signatures before or after folding to form the backbone folds, and again folding the individual ones of the signatures cut from the composite in order to form intermediate folds. With these steps, the method still additionally includes the step of slitting the ribbons before or after the ribbons have been merged to provide a slit in at least a portion of the closed ends after forming the signatures.

In accordance with the invention, the step of slitting the ribbons includes cutting at least a portion of the lead edges thereof. Still more specifically, the slitting step includes cutting substantially the entirety of the lead edges of the closed ends of the signatures before the composite is folded to form the backbone folds. Advantageously, the step of slitting the ribbons is performed by timed slitting of the composite after the ribbons have been merged.

Preferably, the timed slitting of the ribbon composite is performed before folding to form the backbone folds or the intermediate folds by using a wheel mounted for rotation on a shaft and having a blade only on a portion of the circumference thereof.

In still another respect, the present invention is directed to a slitting apparatus for slitting a signature of the type having a backbone fold defining a closed end and an intermediate fold transverse to the backbone fold with a lead edge forward of the intermediate fold and a trail edge rearward of the intermediate fold to produce a wrinkle-free signature. The slitting apparatus comprises a roller mounted on a shaft for rotation to receive a plurality of printed ribbons at a common merger point in order to provide a ribbon composite for forming the signatures, and a slitter wheel is mounted on a shaft for rotation for timed slitting of the ribbon composite after the printed ribbons have been merged to form the ribbon composite. Still additionally, the shafts of the roller and the slitter wheel are disposed in generally parallel relation with the slitter wheel having a blade in confronting relation to the roller on only a portion of the circumference where the remainder of the circumference is radially reduced relative to the blade.

In a highly exemplary embodiment of the slitting apparatus, the blade includes an upstream end and a downstream end when considered generally in the direction of rotation of the slitter wheel. The upstream end advantageously has a radius leading to the blade edge from the radially reduced portion of the slitter wheel circumference, and the slitter wheel also preferably has a pair of parallel faces perpendicular to the shaft of the slitter wheel. With this arrangement, the blade is advantageously defined by a surface extending at an acute angle from one of the faces to the other of the faces to form a generally V-shaped blade edge.

Other objects, advantages and features of the present invention will become apparent from a consideration of the following specification taken in conjunction with the accompanying drawings.

DETAILED DESCRIPTION OF THE PREFERRED EMBODIMENT

Figure 1:
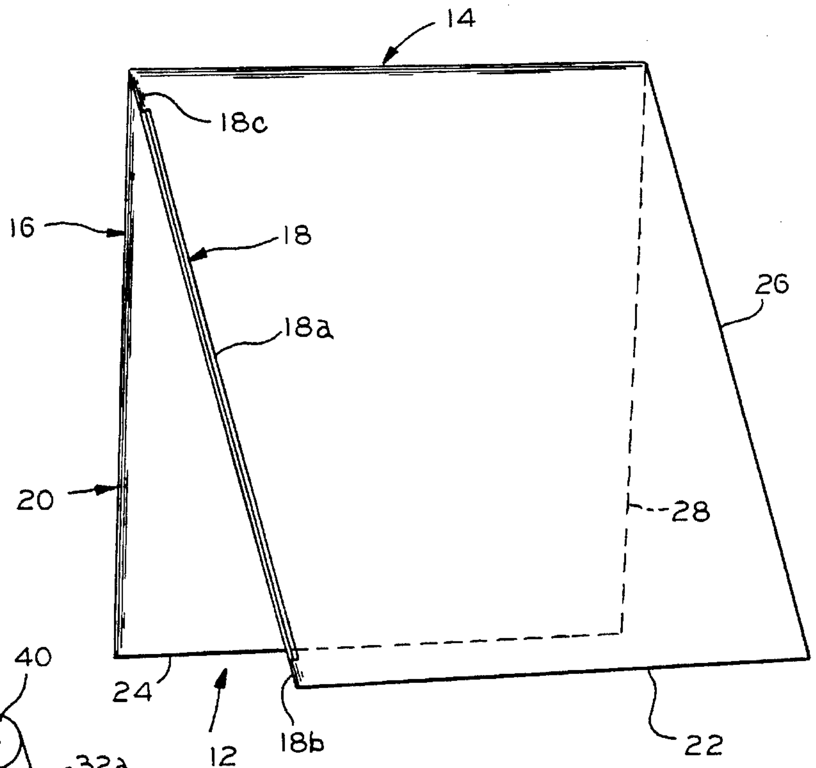
FIG. 1 is a perspective view of a closed end signature that has been produced so as to be wrinkle-free in accordance with the present invention.
Figure 2:
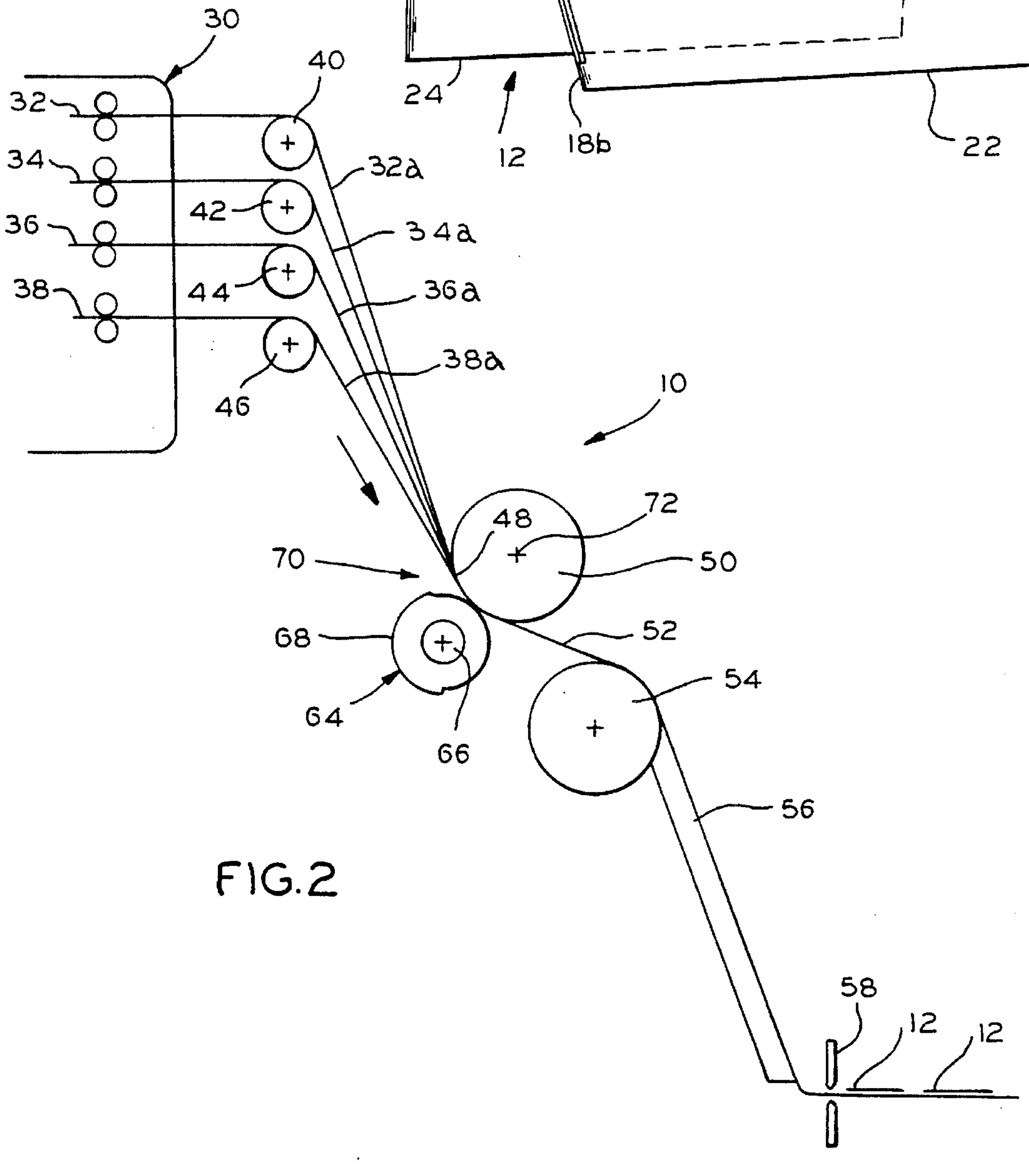
FIG. 2 is a schematic view illustrating an apparatus for producing a wrinkle-free signature of the type such as illustrated in FIG. 1.

In the illustrations given, and with reference first to FIGS. 1 and 2, the reference numeral 10 designates generally an apparatus for producing a wrinkle-free signature 12 of the type having a closed intermediate fold 14 and a closed backbone fold 16. The closed backbone fold 16 defines a closed end having a lead edge 18 forward of the intermediate fold 14 and a trail edge 20 rearward of the intermediate fold 14. As will be appreciated by specifically referring to the signature 12 as shown in FIG. 1, the remaining edges 22, 24, 26, and 28 are all open edges, i.e., they are not edges that are formed by folding.

In the illustrated embodiment, the intermediate fold 14 extends transverse to the backbone fold 16 and comprises a head fold, although it could comprise a foot fold.

Figure 3:
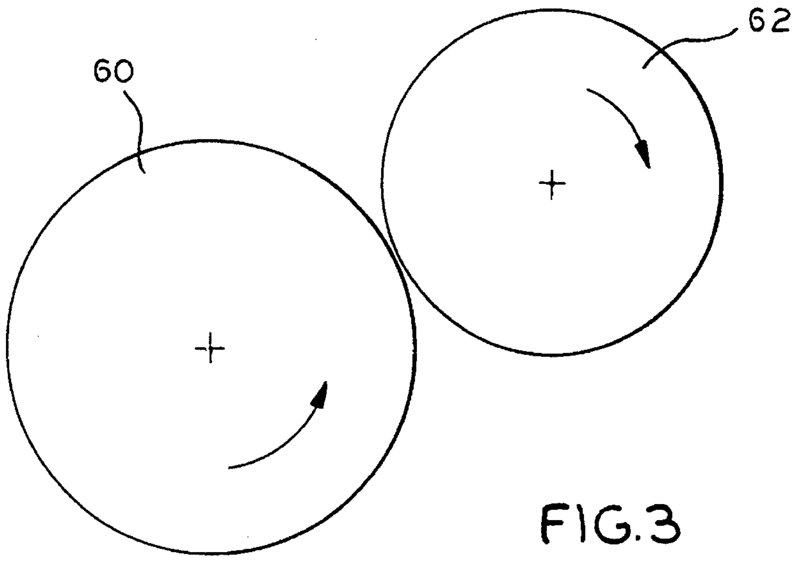
FIG. 3 is a schematic view of another portion of an apparatus for producing a closed end signature of the type such as illustrated in FIG. 1.

Referring specifically to FIGS. 2 and 3, the apparatus 10 will be seen to include a press generally designated 30 for printing a plurality of webs such as 32, 34, 36, and 38 to provide ribbons such as **32*a*, 34*a*, 36*a*, and 38*a* to be utilized in forming the signatures 12. It will also be seen that the apparatus 10 includes means such as the power driven rollers 40, 42, 44, and 46 for delivering the ribbons such as 32*a*, 34*a*, 36*a*, and 38*a* to a common merger point 48. With this arrangement, the apparatus 10 also will be seen to include means such as the power driven roller 50 for merging the ribbons 32*a*, 34*a*, 36*a*, and 38*a* at the common merger point 48 so as to form a composite 52 to be utilized for forming the signatures 12**.

Still referring to FIGS. 2 and 3, the apparatus 10 includes means such as the roller top 54 and former board 56 for folding the composite 52 in order to form the backbone folds 16 defining the closed ends of the signatures 12. It will still further be seen from FIGS. 2 and 3 that the apparatus 10 includes means such as the cutter 58 for cutting the composite 52 before or, preferably, after forming the backbone folds 16 so as to create individual ones of the signatures 12. Referring specifically to FIG. 3, the apparatus 10 further includes means such as the collect cylinder 60 and jaw cylinder 62 for folding the individual ones of the signatures 12 cut from the composite 52 to form the intermediate folds 14.

As for specifics of the press 30, drive rollers 40, 42, 44, and 46, drive roller 50, roller top 54, former board 56, cutter 58, collect cylinder 60 and jaw cylinder 62, they can all take the form of one or more of the various commercially available devices that are presently utilized in the industry for producing signatures, particularly of the head fold type having a backbone fold defining a closed end with a lead edge forward of the head fold and a trail edge rearward of the head fold.

Referring once again to FIG. 2, the apparatus 10 will be seen to still additionally include means for slitting the ribbons **32*a*, 34*a*, 36*a*, and 38*a* before or, preferably, after they have been merged to form the composite 52 in such manner as to result in a slit in at least a portion of the closed ends 16 of the signatures 12 before forming the intermediate or head folds 14. This advantageously takes the form of a slitter wheel generally designated 64 which is mounted for rotation on a shaft 66 and has a blade 68 only on a portion of the circumference thereof. Preferably, the slitter wheel 64 produces timed slitting of the ribbon composite 52 after the printed ribbons 32*a*, 34*a*, 36*a*, and 38*a* have been formed into the ribbon composite 52 but before forming either of the folds 14 and 16**.

Referring to FIGS. 1 and 2, the cutting means or slitter wheel 64 will be understood to include means such as the slitting blade 68 which is adapted to cut through the ribbons **32*a*, 34*a*, 36*a*, and 38*a* along at least a portion 18*a* of the lead edges 18 of the signatures 12**. It will be seen from FIG.

1 that this preferably includes cutting substantially the entirety of the lead edges 18 leaving only a relatively small unslit area 18*b* adjacent the edge 22 and a similarly relatively small unslit area 18*c* adjacent the fold 14. For this purpose, the blade 68 is adapted to cut through all of the printed ribbons 32*a*, 34*a*, 36*a*, and 38*a* in the portions 18*a* of the lead edges 18 of the ribbons which are merged to provide the ribbon composite 52.

Figure 4:
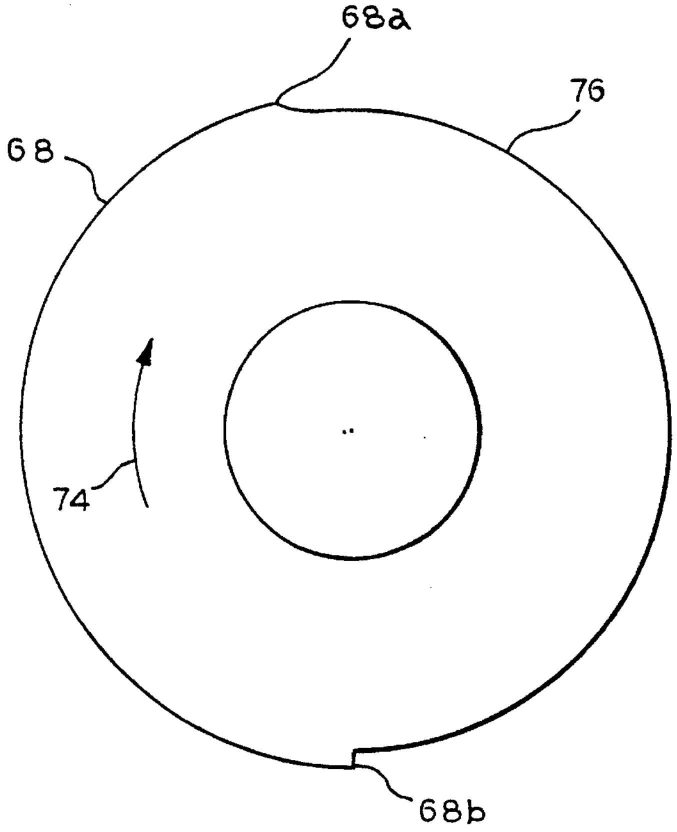
FIG. 4 is a front elevational view of a blade for the apparatus such as illustrated in FIG. 2.
Figure 5:
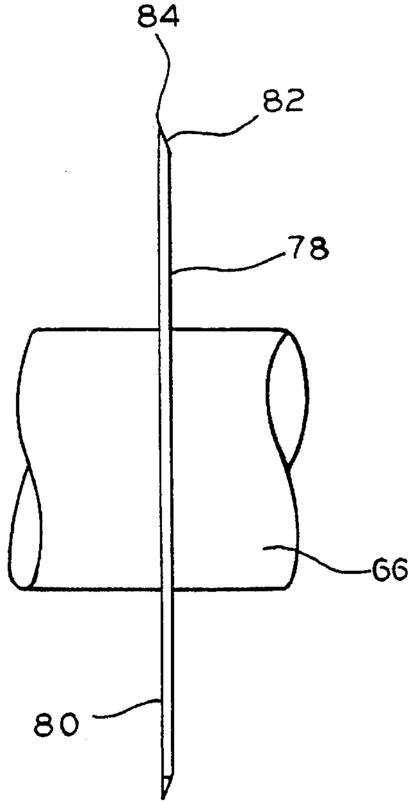
FIG. 5 is an end elevational view of the blade such as illustrated in FIG. 4.

Referring to FIGS. 2, 4 and 5, the present invention will also be understood, in another sense, as being directed to a slitting apparatus 70 for cutting a signature 12 of the type previously described in order to produce a wrinkle-free signature. The slitting apparatus 70 will be seen as comprising the drive roller 50 which is mounted on a shaft 72 for rotation to receive the plurality of printed ribbons 32*a*, 34*a*, 36*a*, and 38*a* at the common merger point 48 to provide the ribbon composite 52 for forming the signatures 12, and also comprising the slitter wheel 64 mounted on the shaft 66 for rotation for timed slitting of the ribbon composite 52 after the printed ribbons 32*a*, 34*a*, 36*a*, and 38*a* have been merged to form the ribbon composite 52. As shown in FIG. 2, the respective shafts 66 and 72 of the slitter wheel 64 and drive roller 50 are disposed in generally parallel relation with the blade 68 in confronting relation to the drive roller 50 on only a portion of the circumference thereof.

Referring specifically to FIG. 4, it will be seen that the remainder of the circumference of the slitter wheel 64 is radially reduced relative to the blade 68.

Referring now to FIGS. 4 and 5, the blade 68 includes an upstream end 68*a* and a downstream end 68*b* in the direction of rotation of the slitter wheel 64 which is represented by the arrow 74. The upstream end 68*a* will be seen to have a radius leading to the blade 68 from the radially reduced portion 76 of the circumference of the slitter wheel 64, and the slitter wheel 64 will also be seen to have a pair of generally parallel faces 78 and 80 which are disposed generally perpendicular to the shaft 66 thereof as is best illustrated in FIG. 5. As also shown in FIG. 5, the blade 68 is defined by a surface 82 extending at an acute angle from one of the faces 78 to the other of the faces 80 to form a generally V-shaped blade edge 84.

In another respect, the present invention is directed to a method of producing a wrinkle-free signature 12 of the type having an intermediate fold 14 and a backbone fold 16 defining a closed end with a lead edge 18 forward of the intermediate fold 14 and a trail edge 20 rearward of the intermediate fold 14. The method includes the steps of printing a plurality of webs 32, 34, 36, and 38 on a press 30 to provide ribbons 32*a*, 34*a*, 36*a*, and 38*a* to be utilized in forming the signatures 12, delivering the ribbons 32*a*, 34*a*, 36*a*, and 38*a* after the webs 32, 34, 36 and 38 have been printed on the press 30 to a common point 48 for ribbon merger and merging the ribbons 32*a*, 34*a*, 36*a*, and 38*a* at the common point 48 to form a composite 52 to be utilized in forming the signatures 12. The method also includes the steps of folding the composite 52 in order to form the backbone folds 16 defining the closed ends of the signatures 12, cutting the composite 52 into individual ones of the signatures 12 before or after folding to form the backbone folds 16, and folding the individual ones of the signatures 12 cut from the composite 52 in order to form the intermediate folds 14. With this arrangement, the method still additionally includes the step of slitting the ribbons 32*a*, 34*a*, 36*a*, and 38*a* before or after they have been merged to form the composite in such manner as to result in a slit in at least a portion of the closed ends 16 after forming the signatures 12.

Advantageously, the timed slitting occurs after the printed ribbons 32*a*, 34*a*, 36*a*, and 38*a* have been merged to form the ribbon composite 52 but before folding to form the backbone folds 16 or the intermediate or head folds 14.

Still additionally, the step of slitting the ribbons 32*a*, 34*a*, 36*a*, and 38*a* will advantageously be understood as including the cutting of at least a portion of the lead edges 18 of the signatures 12 and, preferably, cutting substantially the entirety 18*a* of the lead edges 18 thereof. Furthermore, the step of cutting advantageously includes cutting through all of the printed ribbons 32*a*, 34*a*, 36*a*, and 38*a* which have been merged by using a wheel 64 mounted for rotation on a shaft 66 and having a blade 68 only on a portion of the circumference thereof.

As will now be appreciated, the present invention utilizes the concept of using a timed slit to eliminate gusset wrinkles in a closed end signature 12. The timed slit is located on what becomes the lead edge 18 of the signature 12 and, preferably, is produced before the ribbons 32*a*, 34*a*, 36*a*, and 38*a* travel across the roller top 54 and former board 56. For this purpose, a modified circular blade in the form of the slitter wheel 64 is advantageously located just upstream of the roller top 54.

With the present invention, the timed slit could possibly be accomplished elsewhere depending upon equipment layout. It is important, however, for the timed slit to be in relation to the cut off of the composite into individual signatures in order for the slit to be at the desired location along the lead edge of the signatures. In other words, the timing is important in order to control the length of the unslit areas.

In one example of the present invention, the lead edge 18 of the signature 12 was slit so as to form an unslit area 18*b* of a length of 0,500" and so as to form an unslit area 18*c* of a length of 0,125". These areas are advantageously unslit because of conditions existing with available equipment, and it has been found that the 0,500" unslit area 18*b* allows for stability in the press room both in the automated material handling systems and by the press operators while the 0,125" unslit area 18*c* provides stiffness at the head of the signature to allow the binding equipment (most notably the "gatherer" area of the equipment) to handle each signature without generating top page tears of the signature. Moreover, it has been discovered in practice that wherever an unslit area begins at the head of the signature, i.e., an unslit area such as 18*c*, that is where a gusset wrinkle will occur.

By selecting the length of the unslit area 18*c* at the head of the signature to be a relatively small dimension such as 0.125", it has been found that this is a relatively ideal measurement with present equipment due to the fact that this portion of the signature is held in place by the moving jaws of the jaw cylinder 62. Any greater measurement would result in a gusset wrinkle being generated. As for selecting the length of the unslit area 18*b* at the foot of the signature to be of an also relatively small dimension such as 0.500", it has been found that this does in fact generate a gusset wrinkle but the binding process eliminates it by trimming off this area of the signature.

Ideally, the entire lead edge 18 of the signature 12 would be slit in order to eliminate any wrinkle at any point in the process but this is not possible with much if not all of existing bindery equipment.

By slitting the lead edge 18 of the signature 12, the gusset wrinkles are eliminated by allowing air to escape from the signatures 12 while also allowing for a smoother transition of the signature 12 through the folding equipment. It is the combination of trapped air together with operation of the folding equipment that has in the past generated the gusset wrinkles. Because the lead edge 18 of the signature 12 is slit, that portion of the signature 12 becomes very pliable or free-flowing while also allowing trapped air to escape to accomplish a smooth transfer through the folding equipment.

While this invention has been tested in conjunction with a Harris 2FJ Folder with a 22.776 cut off, the invention is not limited to use with this equipment since, regardless of the size of the cut-off or manufacturer of the equipment, the invention will eliminate gusset wrinkles on any closed end signature.

While in the foregoing there has been set forth a preferred embodiment of the invention, it will be appreciated that the details herein given may be varied by those skilled in the art without departing from the true spirit and scope of the appended claims.

I claim:

1. A method of producing at least one wrinkle-free signature of the type having a backbone fold defining a closed end and an intermediate fold transverse to said backbone fold with said backbone fold having a lead edge forward of said intermediate fold and a trail edge rearward of said intermediate fold, comprising the steps of:

printing a plurality of webs on a press to provide ribbons to be utilized in forming said at least one signature;

delivering said ribbons after said webs have been printed on said press to a common point for ribbon merger;

merging said ribbons at said common point to form a composite to be utilized in forming said at least one signature;

folding said composite in order to form said backbone fold defining said closed end of said at least one signature;

cutting said composite into said at least one signature before or after folding to form said backbone fold;

folding said at least one signature cut from said composite in order to form said intermediate fold; and slitting said ribbons before or after said ribbons have been merged to form said composite in such manner as to result in a slit in at least a portion of said closed end after forming said at least one signature.

2. The method of claim 1 wherein said step of slitting said ribbons includes cutting at least a portion of said lead edge of said closed end of said at least one signature.

3. The method of claim 1 wherein said step of slitting said ribbons includes cutting substantially the entirety of said lead edge of said closed end of said at least one signature.

4. The method of claim 1 wherein said step of slitting said ribbons includes cutting before said composite is folded to form said backbone fold.

5. The method of claim 1 wherein said step of slitting said ribbons is performed by timed slitting of said composite after said ribbons have been merged.

6. A method of producing at least one wrinkle-free signature of the head fold type having a backbone fold defining a closed end with a lead edge forward of said head fold and a trail edge rearward of said head fold, comprising the steps of:

printing a plurality of webs on a press to provide printed ribbons to be utilized in forming said at least one signature;

delivering said printed ribbons after said webs have been printed on said press to a common point for merger thereof;

merging said printed ribbons at said common point to provide a ribbon composite for forming said at least one signature;

folding said ribbon composite in order to form said backbone fold defining said closed end of said at least one signature;

cutting said ribbon composite into said at least one signature after folding to form said backbone fold;

folding said at least one signature cut from said ribbon composite in order to form said head fold; and cutting at least a portion of said closed end of said at least one signature by timed slitting of said ribbon composite after said printed ribbons have been merged to form said ribbon composite but before folding to form said backbone fold or said head fold.

7. The method of claim 6 wherein said step of cutting said closed end of said at least one signature includes cutting at least a portion of said lead edge thereof.

8. The method of claim 6 wherein said step of cutting said closed end of said at least one signature includes cutting substantially the entirety of said lead edge thereof.

9. The method of claim 6 wherein said step of cutting includes cutting through all of said printed ribbons which have been merged to provide said ribbon composite.

10. The method of claim 6 wherein said step of cutting includes using a wheel mounted for rotation on a shaft and having a blade only on a portion of the circumference thereof.

11. An apparatus for producing at least one wrinkle-free signature of the type having a backbone fold defining a closed end and an intermediate fold transverse to said backbone fold with said backbone fold having a lead edge forward of said intermediate fold and a trail edge rearward of said intermediate fold, comprising:

a press for printing a plurality of webs to provide ribbons to be utilized in forming said at least one signature;

means for delivering said ribbons after said webs have been printed on said press to a common point;

means for merging said ribbons at said common merger point to form a composite for forming said at least one signature;

means for folding said composite in order to form said backbone fold defining said closed end of said at least one signature;

means for cutting said composite into said at least one signature before or after forming said backbone fold;

means for folding said at least one signature cut from said composite to form said intermediate fold; and means for slitting said ribbons before or after said ribbons have been merged to form said composite in such manner as to result in a slit in at least a portion of said closed end after forming said at least one signature.

12. The apparatus of claim 11 wherein said means for slitting said ribbons includes means for cutting at least a portion of said lead edge of said closed end of said at least one signature.

13. The apparatus of claim 11 wherein said means for slitting said ribbons includes means for cutting substantially the entirety of said lead edge of said closed end of said at least one signature.

14. The apparatus of claim 11 wherein said means for slitting said ribbons includes means for cutting before said composite is folded to form said backbone fold.

15. The apparatus of claim 11 wherein said means for slitting said ribbons includes means for timed slitting of said composite after said ribbons have been merged.

16. An apparatus for producing at least one wrinkle-free signature of the head fold type having a backbone fold defining a closed end with a lead edge forward of said head fold and a trail edge rearward of said head fold, comprising:

a press for printing a plurality of webs to provide printed ribbons to be utilized in forming said at least one signature;

means for delivering said printed ribbons after said webs have been printed to a common point for merger thereof;

means for merging said printed ribbons at said common point to provide a ribbon composite for forming said at least one signature;

means for folding said ribbon composite in order to form said backbone fold defining said closed end of said at least one signature;

means for cutting said ribbon composite into said at least one signature after folding to form said backbone fold;

means for folding said at least one signature cut from said ribbon composite to form said head fold; and means for cutting at least a portion of said closed end of said at least one signature by timed slitting of said ribbon composite after said printed ribbons have been merged to form said ribbon composite but before folding to form said backbone fold or said head fold.

17. The apparatus of claim 16 wherein said means for cutting said closed end of said at least one signature includes means for cutting at least a portion of said lead edge thereof.

18. The apparatus of claim 16 wherein said means for cutting said closed end of said at least one signature includes means for cutting substantially the entirety of said lead edge thereof.

19. The apparatus of claim 16 wherein said means for cutting includes a blade for cutting through all of said printed ribbons which have been merged to provide said ribbon composite.

20. The apparatus of claim 16 wherein said means for cutting includes a wheel mounted for rotation on a shaft and having a blade only on a portion of the circumference thereof.

21. A slitting apparatus for cutting a signature of the head fold type having a backbone fold defining a closed end with a lead edge forward of said head fold and a trail edge rearward of said head fold to produce a wrinkle-free signature, comprising:

a roller mounted on a shaft for rotation to receive a plurality of printed ribbons at a common merger point to provide a ribbon composite for forming said signatures; and a slitter wheel mounted on a shaft for rotation for timed slitting of said ribbon composite after said printed ribbons have been merged to form said ribbon composite;

said shafts of said roller and said slitter wheel being disposed in generally parallel relation, said slitter wheel having a blade in confronting relation to said roller on only a portion of the circumference thereof, the remainder of the circumference of said slitter whirl being radially reduced relative to said blade;

said blade including an upstream end and a downstream end in the direction of rotation of said slitter wheel, said upstream end having a radius leading to said blade from said radially reduced portion of the circumference of said slitter wheel.

22. The slitting apparatus of claim 21 wherein said slitter wheel has a pair of generally parallel faces generally perpendicular to said shaft thereof, said blade being defined by a surface extending at an acute angle from one of said faces to the other of said faces to form a generally V-shape blade edge.

* * * * *

UNITED STATES PATENT AND TRADEMARK OFFICE

CERTIFICATE OF CORRECTION

PATENT NO. : 5,535,996

DATED : July 16, 1996

INVENTOR(S) : DANCAUSE, James M.

It is certified that error appears in the above-identified patent and that said Letters Patent is hereby corrected as shown below:

column 6, line 32,replace "0,500"" with --0.500"--;

column 6, line 33, replace "0,125"" with --0.125"--;

column 6, line 35, replace "0,500"" with --0.500"--;

column 6, line 38, replace "0,125"" with --0.125"--; and column 10, line 22, replace "whirl" with --wheel--.

Signed and Sealed this

Twelfth Day of November, 1996

Attest:

Bruce Lehman

BRUCE LEHMAN

*Attesting Officer*

*Commissioner of Patents and Trademarks*